United States Patent [19]

Nagazumi

[11] 3,899,937

[45] Aug. 19, 1975

[54] COLLAPSIBLE STEERING COLUMN ASSEMBLY

[75] Inventor: Yasuo Nagazumi, Tokyo, Japan

[73] Assignee: Nissan Motor Co., Ltd., Yokohama, Japan

[22] Filed: July 13, 1973

[21] Appl. No.: 378,872

[30] Foreign Application Priority Data

July 14, 1972  Japan.............................. 47-69994

[52] U.S. Cl.................................. 74/492; 308/6 B
[51] Int. Cl............................................. B62d 1/18
[58] Field of Search................ 74/492, 493; 308/6 B

[56] References Cited

UNITED STATES PATENTS

| 3,281,189 | 10/1966 | Danneman | 308/6 B |
| 3,597,994 | 8/1971 | Shiomi | 74/492 |
| 3,699,824 | 10/1972 | Staudenmayer | 74/492 |
| 3,788,148 | 1/1974 | Connell | 74/492 |

*Primary Examiner*—Allan D. Herrmann

[57] ABSTRACT

Two telescoping tubes connecting a steering wheel and steering gear assembly such that the steering wheel may be displaced forwardly and the steering gear assembly displaced rearwardly during a collision of the vehicle, but the steering wheel is prevented from being displaced rearwardly.

2 Claims, 7 Drawing Figures

COLLAPSIBLE STERING COLUMN ASSEMBLY

The present invention generally relates to vehicle steering column assemblies and more particularly to collapsible vehicle steering column assemblies.

Until recently, steering columns actually utilized in automobiles were rigid so that during collisions, the operators of the automobiles frequently suffered serious or fatal injuries as a result of inertial impact against the steering wheel. Recently, various embodiments and variations of collapsible steering columns have been utilized so that the steering column collapses if the operator strikes thereagainst with a force greater than a predetermined volue.

Collapsible steering columns per se have not proven entirely satisfactory, however. During normal operation of an automobile, the operator sits behind the steering wheel with his hands controlling the wheel. Even during normal operation of the automobile, if the operator suddenly pushes the brake pedal, the automobile rapidly decelerates, and the operator will try to withstand the deceleration by imposing a relatively high load on the steering wheel, so that the predetermined force beyond which the steering column assembly will collapse must be higher than this load for practical purposes. When a collision occurs, the automobile rapidly decelerates and the operator is thrust forward toward the steering wheel. During the collision, the operator of the automobile moves toward the steering wheel with an ever increasing velocity, i.e. the operator accelerates while moving forward from the normal seating position. Hence, at the time the operator strikes the steering wheel, his forward velocity is very high. As is well known, the greater the velocity at the time of impact, the greater will be the impact force. Thus, even if the steering column is collapsible, the operator of the vehicle frequently incurs serious or fatal injury as a result of impact force in striking the steering wheel because the practical predetermined force in response to which the steering column is designed to collapse must be necessarily high.

In the present invention, this problem of the prior art is successfully overcome in that during the first stage of a collision, the steering gear assembly, which is attached to a collapsible frame member of the vehicle, is driven rearward, thus imparting an axial force greater than the predetermined value to the collapsible steering column. The steering column thus collapses, but the steering wheel is prevented from being displaced rearward toward the operator by a suitable clamp. This clamp does, however, allow the steering wheel to be displaced forward if a comparatively small force is applied to it. Thus, since the steering column has already begun to collapse in response to the force applied thereto by the steering gear assembly, when the operator is thrown forward against the steering wheel, the steering wheel will be displaced forward and further collapse the steering column, but in doing so, will offer very little resistance to the forward motion of the driver, and the driver will not be injured by impact with the steering wheel.

Accordingly, it is an object of the present invention to provide an improved energy absorbing collapsible steering column assembly which allows forward displacement of the steering wheel and rearward displacement of the steering gear assembly during a collision of the vehicle, but prevents the steering wheel from moving rearward toward the operator, and offers very little resistance to the forward motion of the operator, thus preventing injury to the operator.

This and other objects, advantages and features of the present invention will be readily apparent from the following description and the accompanying drawings wherein.

Figure 3:
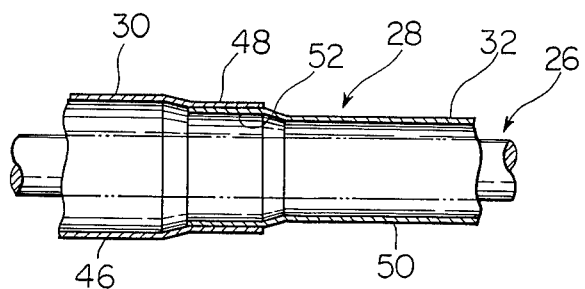
FIG. 3 is an enlarged sectional view of one embodiment of a portion of the collapsible steering column assembly of FIG. 1 (or FIG. 2) indicated within a broken circle.
Figure 4:
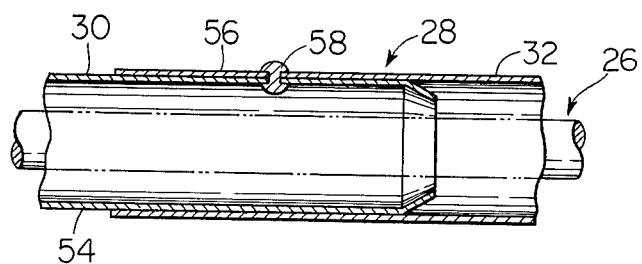
FIG. 4 is similar to FIG. 3 but illustrates another embodiment of the portion thereof.
Figure 5A:
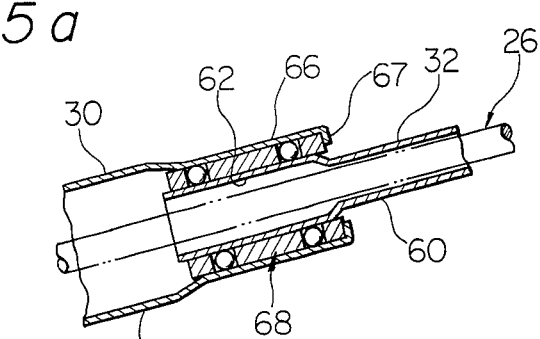
Figure 5B:
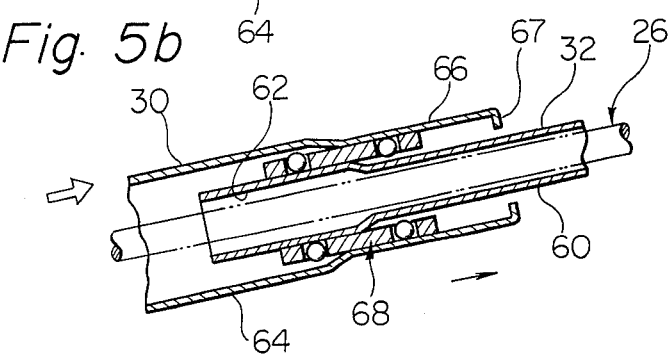
Figure 6:
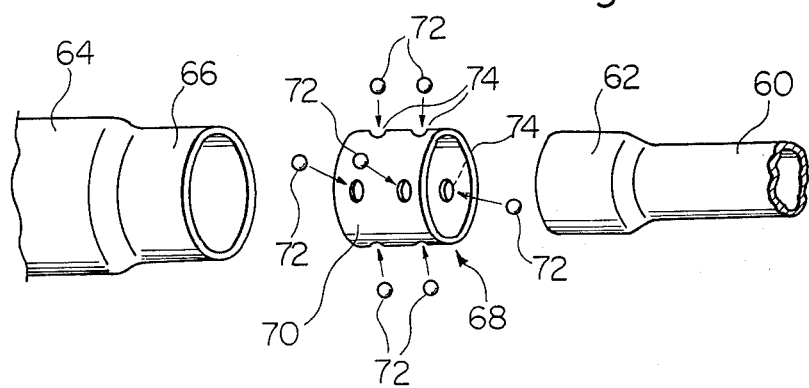

FIGS. 5a and 5b are enlarged sectional views of still another embodiment of the portion of FIGS. 3 and 4 but respectively illustrate the portion in a normal and a collapsed condition; and FIG. 6 is an exploded view of the portion of the collapsible steering column of FIGS. 5a and 5b.

Figure 1:
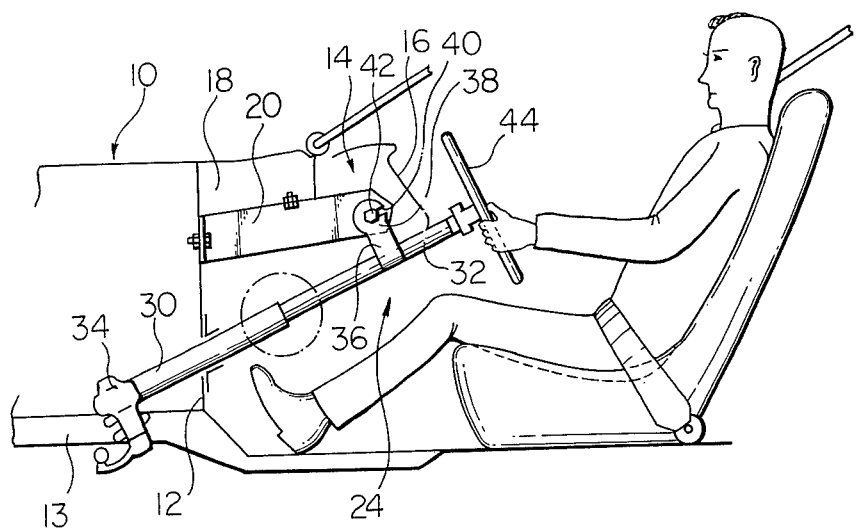
FIG. 1 is a fragmentary sectional schematic view of an automobile including a collapsible steering column assembly according to the present invention and illustrates a normal condition thereof.
Figure 2:
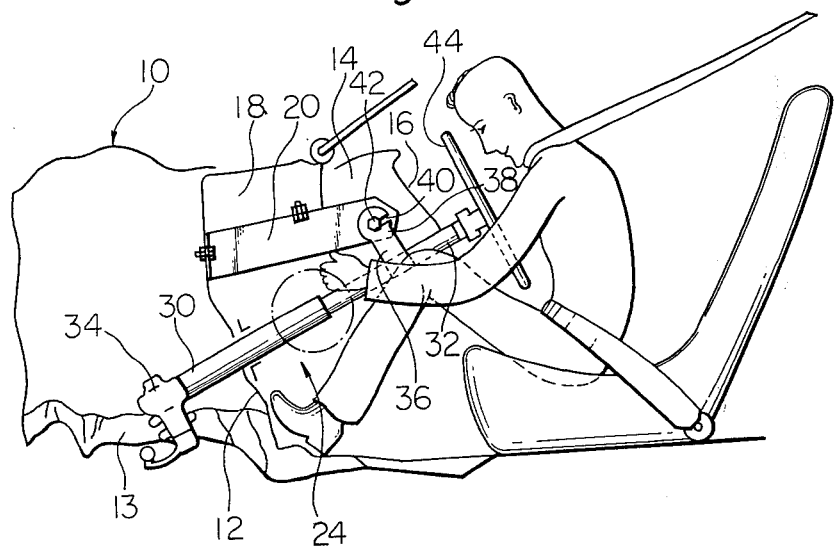
FIG. 2 is a view similar to FIG. 1 but illustrates the automobile and steering column assembly in a collapsed condition.

Referring now particularly to FIGS. 1 and 2 of the drawings, a steering column assembly of the present invention, generally designated as 24, is shown arranged in an automotive vehicle body, designated generally as 10, conventionally including a forward fire wall 12 separating a passenger compartment from a forward body compartment and being supported by a frontal end frame structure (no numerals respectively) having a longitudinally extending rail or frame member 13, which is constructed and arranged in the frontal end frame structure so that it may deform or distort to absorb impact energy during a collision of the vehicle. The vehicle body 10 further includes a generally conventional instrument panel 14 spaced from the fire wall 12 and including a face panel 16 extending transversely between left and right front door pillar structures of the vehicle body 10, not shown, a reinforcing channel 18 connecting the pillar structures for rigidity, and a steering column mounting bracket 20 connected to the channel 18 and the fire wall 12 by bolts.

The steering column assembly 24 generally includes an inner steering shaft 26, and an outer supporting column 28 enclosing the steering shaft 26 (see FIG. 3). The steering shaft 26 may comprise a splined or similar portion such that substantial variation of its effective length is possible, although not shown.

The supporting column 28 includes a first jacket tube 30 extending through the fire wall 12 and a second jacket tube 32 axially aligned with the first jacket tube 30. The first jacket tube 30 operatively engages with a conventional steering gear assembly 34 which is in turn mounted on the frame member 13. The second jacket tube 32 is supported by a generally U-shaped mounting strap or clamp 36 (not shown in detail) including hanger portions 38 having rearwardly opening slots 40. Bolts 42 transversely extend from the bracket 20 and supportingly pass through the slots 40 in the hanger portions 38. Nuts (not shown) are tightened onto the bolts 42 to a degree sufficient to firmly hold the second jacket tube 32 but not so tight as to substantially prevent axial forward displacement of the second jacket tube 32 in response to inertial impact of the vehicle operator thereto during a collision of the vehicle. The first jacket tube 30 and the second jacket tube 32 are telescopically movable relative to each other and are normally fixed to each other by suitable connecting means in a manner shortly to be described. During frontal collision of the vehicle, the frame member 13 collapses thus causing the steering gear assembly 34 to be displaced reawardly. The connecting means between the first and second jacket tubes 30 and 32 then disconnects in a manner to be described below in detail, and the first jacket tube 30 telescopes onto the second jacket tube 32 to absorb the displacement of the gear assembly 34. A steering wheel 44 connected to the second jacket tube 32 is prevented from moving toward the vehicle operator by the clamp 36 and the bolts 40.

However, if the vehicle operator is thrown forward against the steering wheel 44, the steering 44 will move forward so as to prevent injury to the operator because the clamp 36 is designed by means of its slots 40 to allow disconnection of the second jacket tube 32 from the bracket 20 in a forward direction, and the second jacket tube 32 telescopes into the first jacket tube 30.

Referring now to FIG. 3, which shows one embodiment of the connecting means mentioned above, the first jacket tube 30 is an elongated tube having a cylindrical wall portion 46. At its upper end, the cylindrical wall portion 46 tapers inwardly into a reduced profile sleeve portion 48. The second jacket tube 32 is also an elongated tube having a cylindrical wall portion 50. At its lower end, the cylindrical wall portion 50 tapers outwardly into an expanded profile sleeve portion 52 which is press-fitted into the sleeve portion 48. In practice, when an axial force of sufficient magnitude is imported to the steering gear assembly 34, the resistance of the press fit between the sleeve portions 48 and 52 is overcome, and the first jacket tube 30 telescopes onto the second jacket tube 32.

Referring next to FIG. 4, there is shown another embodiment of the connecting means mentioned above. In this figure the same reference numerals as those used in FIG. 3 are used to designate like or similar elements.

Referring now to FIGS. 1, 2 and 3, the first jacket tube 30 is an elongated tube having a cylindrical wall portion 54. At its upper end, the cylindrical wall portion 54 tapers inwardly. The second jacket tube 32 is an elongated tube having a cylindrical portion 56. At its lower end, the cylindrical portion 56 is axially maintained, relative to the cylindrical wall portion 54 by a rivet 58 which is designed to be broken or sheared to permit the first jacket tube 30 to telescope onto the second jacket tube 32 when an axial force of sufficient magnitude is imparted to the steering gear assembly 34.

Referring to FIGS. 5a, 5b and 6, there is shown a still another embodiment of the connecting means, in which the same reference numerals as those used in FIG. 3 are used to designate like or similar elements.

Referring now to FIGS. 1, 2, 5a and 6, the second jacket tube 32 is an elongated tube having a cylindrical wall portion 60 which closely encloses the inner steering shaft 26. At its lower end, the cylindrical wall portion 60 tapers outwardly into an enlarged profile sleeve portion 62. The first jacket tube 30 is an elongated tube having a cylindrical wall portion 64. At its upper end, the cylindrical wall portion 64 tapers inwardly into a reduced profile sleeve portion 66 which is maintained relative to the sleeve portion 62 by a thrust bearing generally designated as 68. At its upper end, the sleeve portion 66 is turned inward to define a folded portion 67 with which the thrust bearing 68 normally engages securely, as shown in FIG. 5a.

As best seen in FIG. 6, the thrust bearing 68 includes a cylindrical ball carrier 70 and a plurality of balls 72. The cylindrical ball carrier 70 has formed therein a plurality of holes 74 for receiving the balls 72, respectively. In assembling the parts shown in FIG. 6, it may be possible to fit the thrust bearing 68 loosely between the sleeve portions 62 and 66 and then fix the assembly together by pressing.

In the event of a collision of the vehicle which causes the steering gear assembly 34 to be displaced rearwardly, the first jacket tube 30 telescopes onto the second jacket tube 32, as best seen in FIGS. 2 and 5b.

When constructed in accordance with the present invention, a steering column assembly enables telescopic movement of the first jacket tube onto the second jacket tube, but prevents movement of the second jacket tube and thus the steering wheel toward the vehicle operator if the steering gear assembly is displaced rearwardly during a vehicle collision, and allows the second jacket tube to telescope forwardly into the first jacket tube to absorb impact of the operator against the steering wheel, which might occur even if the vehicle operator is restrained by a seat belt such as shown in FIGS. 1 and 2.

Of particular significance is the fact that in the event of a collision of the vehicle, the frame member which mounts the steering gear assembly collapses or deforms and thus provides substantial primary impact energy absorption. Also it is a appreciated that a collapsible steering assembly in accordance with the present invention is particularly effective in protecting the vehicle operator from being injured if it is used in conjunction with a seat belt.

What is claimed is:

1. In a vehicle,
a steering gear assembly;
a collapsible frame member having mounted thereon said steering gear assembly, said collapsible frame member being so constructed and arranged that during the initial stage of a frontal collision of the vehicle it deforms and causes said steering gear assembly to displace rearwardly of the vehicle;
a collapsible steering column having first and second jacket tubes, said first jacket tube being connected to said steering gear assembly and said second jacket tube being telescopically related to said first jacket tube;
means for supporting said second jacket tube from another frame member of the vehicle in a manner permitting telescopic movement against said first jacket tube but preventing movement away from said first jacket tube;
said first and second jacket tubes being so constructed and telescopically connected with each other, such that when said steering gear assembly is displaced rearwardly of the vehicle by deformation of said collapsible frame member during the initial stage of a frontal collision of the vehicle, application of an axial load by said steering gear assembly to said first jacket tube tending to urge said first jacket tube against said second jacket tube causes said first jacket tube to telescopically move relative to said second jacket tube and renders said second jacket tube telescopically movable against said first jacket tube, and wherein said first jacket tube has a reduced profile sleeve portion and said second jacket tube has an expanded profile sleeve portion press fitted into said reduced profile sleeve portion.

2. In a vehicle, a steering gear assembly;

a collapsible frame member having mounted thereon said steering gear assembly, said collapsible frame member being so constructed and arranged that during the initial stage of a frontal collision of the vehicle it deforms and causes said steering gear assembly to displace rearwardly of the vehicle;

a collapsible steering column having first and second jacket tubes, said first jacket tube being connected to said steering gear assembly and said second jacket tube being telescopically related to said first jacket tube;

means for supporting said second jacket tube from another frame member of the vehicle in a manner permitting telescopic movement against said first jacket tube but preventing movement away from said first jacket tube;

said first and second jacket tubes being so constructed and telescopically connected with each other, such that when said steering gear assembly is displaced rearwardly of the vehicle by deformation of said collapsible frame member during the initial stage of a frontal collision of the vehicle, application of an axial load by said steering gear assembly to said first jacket tube tending to urge said first jacket tube against said second jacket tube causes said first jacket tube to telescopically move relative to said second jacket tube and renders said second jacket tube telescopically movable against said first jacket tube, and wherein said first jacket tube has a reduced profile sleeve portion, said second jacket tube an expanded profile sleeve portion surrounded by said reduced profile sleeve portion and a thrust bearing having a cylindrical ball carrier positioned with press fit between said reduced profile sleeve portion and said expanded profile sleeve portion.

* * * * *